ial compounds to the aromatic

United States Patent Office 3,791,996
Patented Feb. 12, 1974

---

3,791,996
DIRECT ACYLAMINOMETHYLATION OF AROMATIC POLYMERS
Richard B. Wuchter, Huntingdon Valley, Pa., assignor to Rohm and Haas Company, Philadelphia, Pa.
No Drawing. Filed Nov. 1, 1971, Ser. No. 194,496
Int. Cl. C08f 27/08
U.S. Cl. 260—2.1 E    10 Claims

ABSTRACT OF THE DISCLOSURE

A novel method of preparing resins is presented which involves the direct acylaminomethylation of uncrosslinked or crosslinked aromatic polymers, for example styrene-containing polymers. Acylaminomethylated crosslinked aromatic polymers are readily hydrolyzed to the corresponding aminomethylated polymers and then optionally quaternized to form the corresponding strong base, quaternary ammonium anion exchange products.

---

This invention relates to the production of resins or polymers, especially anion exchange resins and, more particularly, to an improved and novel process for making anion exchange resins, both weak base and strong base, by a novel procedure which involves the direct attachment of acylaminomethyl, or more simply, aminomethyl groups on to crosslinked aromatic or benzenoid polymers. These crosslinked aromatic polymers are ordinarily based on styrene or styrene-like monomers.

It is, of course, well known that synthetic resins having anion exchanging properties can be produced by introducing aminolakyl groups into crosslinked aromatic vinyl polymers by haloalkylation and amination and, if desired, subsequent alkylation. It is also known that anion exchangers can be made by reacting crosslinked benzene-insoluble organic polymers containing aromatic nuclei, in the presence of a swelling agent and a Friedel-Crafts catalyst, with a N-haloalkyl-N-alkylacylamide such as N-methyl-N-chloromethylacetamide, or an N-(halo-geno-alkyl)-cyclic-imide such as N-(chloromethyl)-phthalimide, followed by hydrolysis and alkylation. All of these processes involve the use or generation of halogen-containing materials such as chloromethyl ether, or a halogenated material which has itself been prepared by the use of chloromethyl ether or by a reaction in which chloromethyl ether is generated or might be generated. Additionally, these prior art processes ordinarily use or require the use of metal-containing, Friedel-Crafts catalysts.

Although chloromethyl ether has been used for years in the production of many materials, including ion exchange resins, it has recently been reported in a New York University Medical Center report that bischloromethyl ether was linked to bronchogenic cancer in rats. Bischloromethyl ether is commonly present in small amounts in methyl chloromethyl ether (usually called simply chloromethyl ether). Thus, one of the main purposes of this invention is to overcome the toxicity problems associated with the use of certain halogen-containing materials, especially the use of chloromethyl ether and/or bischloromethyl ether.

Broadly, the new and novel method of the present invention comprises first the acylaminomethylation of an aromatic polymer, more preferably a crosslinked polystyrene with an N-methylol compound such as N-methylolacetamide or N-methylolformamide or a methylene-bis-amide such as methylene-bis-formamide or other non-halogen containing precursors of the amidomethyl carbonium ion of the formula

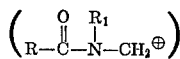

where R and $R_1$ may be hydrogen, alkyl or aryl and where $R_1$ can also be hydroxyalkyl, then hydrolyzing the polymer to remove the acyl groups and convert the polymer to a benzylamine (or aromatic amine) weak base resin, and then quaternizing to form the quaternized product. This process or method gives strong base, anion exchange resins with the required capacity.

While the acylaminomethylating agent (or amidomethylating agent) is preferably an N-methylol compound such as N-methylolformamide or N-methylolacetamide, it can be an amide of the general formula

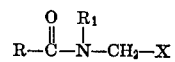

where

R is H or alkyl (preferably 1 to 18 carbon atoms) or aryl (preferably 6 to 18 carbon atoms) or $-NY_1Y_2$ where $Y_1$ and $Y_2$ can be H or alkyl or aryl (having the above preferred carbon atom limitations, both $Y_1$ and $Y_2$ being the same or different).
$R_1$ is H or alkyl (preferably 1 to 18 carbon atoms) or aryl (preferably 6 to 18 carbon atoms) or hydroxyalkyl (alkyl of 1 to 18 carbon atoms) and
X is

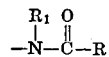

R and $R_1$ having the same significance as given above, or $-OZ$ where Z is H or alkyl (of 1 to 12 carbon atoms) or aryl (of 6 to 12 carbon atoms) or acyl of the formula

where $R_2$ is alkyl of 1 to 18 carbon atoms or aryl of 6 to 18 carbon atoms.

An additional and very important advantage of the present process is the elimination of aluminum or alumina in the resins which derive from the Friedel-Crafts catalyst such as $AlCl_3$. In the past, this has on occasion been a problem, i.e., the alumina or aluminum present in ion exchange resins produced with the aid of a Friedel-Crafts catalyst has been a problem in certain power plant operations. Another advantage is that the resins produced by the present invention show improved kinetic characteristics most probably because of the lack of secondary crosslinking due to the absence of methylene bridging.

The acylaminomethylation reaction is carried out in the presence of a suitable swelling or solvating agent for the aromatic polymer and this may include, for example, halogenated hydrocarbons such as ethylene dichloride, carbontetrachloride, trichloroethylene, 1,1,2 - trichloroethane, tetrachloroethylene, ethylenedibromide, dimethyl-formamide, dichloropropanes, trichloropropanes, and/or mixtures of these. Preferably, however, the swelling agent is a nitro-substituted aliphatic or aromatic hydrocarbon such as the 1 or 2-nitropropane, nitroethane, or nitrobenzene. The nitro-substituting hydrocarbons can be used by themselves, or they can be mixed with one or more of the above named swelling or solvating agents or with dimethylsulfoxide or sulfolane.

The acylaminomethylation reaction can be performed over the temperature range of from about 0° to about 100° C., preferably from about 10° C. to about 60° C., but more preferably the reaction temperature is about 20° C. to about 30° C. The molar amounts of the acylaminomethylating reagent (e.g., N-methylolamide or N-alkyl-N-methylolamide) which are employed per mol of aromatic nuclei or units present in the copolymer can range from about 0.5 to about 4.0. Preferably, the molar ratio or proportion is about 1.5 to 2.5 for high conversion. The acidic catalyst concentration can range from about 300 to 1,000 grams per 100 grams of aromatic polymer or aromatic units, with the preferred range being about 500 to 800 grams per 100 grams of aromatic polymer.

The amount of swelling agent or solvent used depends on its swelling ratio with the polymer to be acylaminomethylated. This will vary somewhat depending on the solvent or swelling agent utilized and the crosslink density and distribution of the polymer. Using the nitroalkanes as a suitable example and crosslinked styrene polymers containing about 2 to 12% by weight of di- or tri-vinyl crosslinking monomer unit, the convenient amount of solvent or swelling agent is varied from about 300 to 1,000 grams per 100 grams of aromatic polymer, with the upper limit being determined only by practical considerations. A preferred solvent or swelling agent level is about 350 to 800 grams per 100 grams of aromatic polymer.

The acylaminomethylation reaction can be readily performed by adding the acidic catalyst to the swollen polymer containing the N-methylolamide or N-alkyl-N-methylolamide or by adding the N-methylolamide (or other amidomethylating agent) to the swollen polymer containing the acidic catalyst. It is preferable to add either the acidic catalyst or the N-methylolamide (or N-alkyl-N-methylolamide) or both gradually so that the heat of reaction can be controlled. The acidic catalyst used in the acylaminomethylation reaction can be, for example, alkyl or aryl sulfonic acids, trichloroacetic acid, phosphoric acid, a mixture of sulfuric acid and acetic acid or anhydride, sulfuric acid, and oleum. The sulfuric acid and/or oleum are preferred as catalysts because of their ready availability and because of other practical considerations.

Removal of the acyl group from the acylaminomethylated polymer can be performed by known means of hydrolysis of amides. It is convenient to use the acid required in the acylaminomethylation as catalyst for this hydrolysis, or other means can be employed as hereinafter set forth.

Conversion of the hydrolyzed acylaminomethylated product to either a weak base anion exchange resin or a strong base anion exchange resin can be performed in known fashion and is demonstrated hereinafter in the examples of this patent application.

In order to hydrolyze or saponify the acylamino derivatives formed, as intermediates, it is possible to use a known process, such as, for example, alkaline or acid hydrolysis, optionally in the presence or absence of solvents or swelling agents.

To effect hydrolysis the intermediate may optionally be separated from the reaction medium, for instance by siphoning off, washed with swelling agent to remove residual catalysts and the amides. If desired, the isolated product may be dried or washed with an organic solvent which is miscible with water such as methanol, ethanol, propanol, dioxane, tetrahydrofuran. Thereafter, the isolated product may be hydrolyzed by reacting it at temperatures ranging between about 50° to 250° C. with about 5 to 40% aqueous or alcoholic solution of an alkaline agent such as sodium hydroxide, potassium hydroxide, or with about 5 to 80% aqueous solution of a mineral acid such as hydrochloric, hydrobromic, or sulfuric acid. The reaction product may be isolated, washed with water and heated with an aqueous solution of a mineral acid to carry out acid hydrolysis if desired. Acid hydrolysis, as noted above, is generally carried out in the temperature range of about 50° C. to about 250° C. The hydrolyzing agents are normally employed in a molar surplus over the intermediate products to be hydrolyzed. The products may be isolated from the reaction medium and washed with dilute aqueous solution of caustic alkalis and thereafter with water until the wash-water remains neutral. If desired, the hydrolysis, especially the acid hydrolysis, can be carried out in the same reactor as the acylaminomethylation reaction, i.e., the acylamino product need not be separated from the reaction medium.

The reaction products can thereafter be alkylated, it being possible for this purpose to use alkylation agents which are known per se, for example alkyl halides (methyl-, ethyl-, propyl-, butyl-chloride, bromide or iodide), dialkyl sulphates (dimethylsulphate, diethylsulphate), alkylene oxides (ethylene oxide, propylene oxide), halohydrins (ethylene chlorohydrin, propylene chlorohydrin, glycerol chlorohydrin), polyhalogen compounds (ethylene chloride, ethylenebromide, 1,4-dibromobutane, glyceroldichlorohydrin) or epihalohydrins (epichlorohydrin, epibromohydrin).

The alkylation is effected by reacting the aforementioned amino derivatives with the alkylating agents which are preferably in a molar surplus at temperatures of about 20° to about 125° C., if necessary in the presence of a diluent such as water, alcohol (methanol, ethanol) and of an alkaline agent such as caustic alkalis (NaOH, KOH), MgO, CaO, or organic bases. Depending on the quantity of alkylating agent applied, there result secondary, tertiary or quaternized amino derivatives or mixtures thereof. A further suitable alkylating agent is a mixture of formaldehyde and formic acid which may be applied in the form of an aqueous solution containing in addition, if necessary, a mineral acid. The reaction with alkylating agent may be carried through at temperatures of about 80° to 120° C. In this case, tertiary amino derivatives are obtained as sole reaction products if the alkylating agents are applied in an excess over the equivalent amount. The tertiary amino derivatives thus obtained may be transformed into quaternary derivatives by reacting the first mentioned compounds with the alkyleneoxides and/or halohydrins as defined above at temperatures of about 10 to 120° C. in the presence of a diluent such as water, alcohol containing an alkaline agent or a weak acid, such as acetic acid, carbonic acid.

It is possible in this way to obtain strongly as well as weakly basic anion exchangers.

A type II quaternary (strong base) salt can be prepared by addition of ethylene oxide under cylinder pressure to a reactor containing the dimethylbenzylamine resin (prepared by reductive methylation of benzylamine resin which is obtainable on hydrolysis of the acylaminomethylated product) or its amine salt in an aqueous medium.

Other reagents for alkylation of dimethylbenzylamine resins include methyl chloride, methyl bromide, methyl iodide, dimethyl sulfate, ethyl iodide, propylene oxide, butylene oxide, styrene oxide, epichlorohydrin, chloroacetic acid, etc.

The crosslinked polymers containing aromatic nuclei as used for carrying out the present process, are known per se. Especially to be considered for this purpose are copolymers of a predominant proportion by weight of at least one aromatic monovinyl compound, such as, for example, styrene, substituted styrenes such as vinyl toluene, ethylstyrene or vinyl naphthalene, and a minor proportion of a polyethylenically unsaturated crosslinking agent preferably divinyl benzene, or a substituted divinyl benzene such as trivinylbenzene, divinyltoluene, divinylxylene, divinylethylbenzene, or divinylether, ethyleneglycol dimethacrylate, ethyleneglycol diacrylate, trimethylolpropane trimethacrylate, diallylmaleate, a polyester of polyhydric alcohol and an olefinically unsaturated carboxylic acid, such as, for example, ethylene glycol and maleic acid. These copolymers can have either a gel structure or a sponge or macroreticular structure. The amount of crosslinking agent may vary within wide limits, but ordinarily it will be used in an amount of about ½ to about 40% by weight, preferably in an amount of about 1 to about 30% by weight and more preferably about 3 to about 25% by weight, based on the total weight of the monomers (both aromatic vinyl and crosslinking in the crosslinked polymer or copolymer.

In the examples below and throughout the specification, all parts and percentages are by weight unless otherwise stated.

EXAMPLE I

Fifty-two grams of a styrene/trimethylolpropanetrimethacrylate (88/12 by weight) [1] macroreticular suspension-prepared polymer are swollen overnight in 400 grams of 1-nitropropane. To this swollen polymer in a stirred flask immersed in an ice bath is slowly added 392 grams of concentrated sulfuric acid at such a rate that the temperature does not exceed 25° C. (about 5 minutes). N-methylolacetamide (94.2 grams) is then slowly added over about 30 minutes maintaining the temperature at 15 to 25° C. After allowing the contents to stir overnight (at about 25° C.), water is slowly added maintaining the temperature at 25° C. or less. The contents are drained of liquid, given two water washes, and the 1-nitropropane azeotroped off with water. After further washing with water, there are obtained 181 grams of 46.8% solids resin which contains 6.3% nitrogen (when dried).

Concentrated hydrochloric acid (400 ml.) is added to the resin and the mixture is refluxed overnight at a temperature of about 100° C. to 105° C. After cooling, the liquid is drained from the polymer and then treated with 500 ml. of 10% sodium hydroxide. The resin is then filtered and washed until neutral. There is obtained 176 grams of wet hydrolyzed weak base resin of 36.3% solids content which contains 7.7% nitrogen (when dried) and has an anion exchange capacity (AEC) of 5.80 milliequivalents/gram (meq./gm.).

This weak base resin is then added to a Parr bomb containing 56 grams of 50% sodium hydroxide, 1 gram potassium iodide and sufficient water to make a stirrable slurry. Methyl chloride is added from a cylinder at about 55 p.s.i.g. with stirring for about 16 hours. After venting the contents, the resin is washed with water until neutral. There are obtained 295 grams of 33.8% solids quaternary strong base resin which has a total anion exchange capacity (TAEC) of 3.89 milliequivalents/gram, with a strong base anion exchange capacity or salt splitting capacity (SSC) of 3.64 milliequivalents/gram.

EXAMPLE II

The same general procedure above is followed except 52 grams of macroreticular styrene/divinylbenzene (DVB) (97/3 by weight) suspension polymer is used and 75.2 grams of N-methylolfromamide is employed in place of N-methylolacetamide. The product of this reaction, i.e., the formylaminomethyl derivative is 158 grams of 48.4% solids and contains 6.4% nitrogen. Hydrolysis gives a weak base resin (139 grams of 45.1% solids) having 7.4% nitrogen and an AEC of 5.67 milliequivalents/gram. Quaternization in the standard mannner with methyl chloride and NaOH gives a strong base resin (240 grams of 41.4% solids) in the chloride form having TAEC of 3.94 milliequivalents/gram and SSC of 3.71 milliequivalents/gram.

EXAMPLE III

Fifty-two grams of a styrene/ethyleneglycoldimethacrylate (89.5/10.5 by weight) macroreticular suspension-prepared polymer are swollen overnight in 400 grams of 1-nitropropane. To this swollen polymer in a flask immersed in an ice bath is slowly added 392 grams of concentrated sulfuric acid at such a rate that the temperature does not exceeed 25° C. (about 5 minutes). N-methylolacetamide (94.2 grams) is then slowly added over about 30 minutes maintaining the temperature at 15 to 25° C. After allowing the contents to stir overnight, water is slowly added maintaining the temperature at 25° C. or less. The contents are drained of liquid, given two water washes, and the 1-nitropropane azeotroped off with water. After further washings with water, there are obtained 183 grams of 45.5% solids resins which contains 6.4% nitrogen (when dried).

Concentrated hydrochloric acid (400 ml.) is added to the resin and the mixture is refluxed overnight. After cooling, the liquid is drained from the polymer and then treated with 500 ml. of 10% sodium hydroxide. The resin is then filtered and washed until neutral. There is obtained 178 gms. of wet hydrolyzed resin of 35.2% solids which contains 7.8% nitrogen (when dried) and has an anion exchange capacity (AEC) of 5.85 milliequivalents/gm.

This weak base resin is then added to a Parr bomb containing 56 gms. of 50% sodium hydroxide, 1 gm. potassium iodide and sufficient water to make a stirrable slurry. Methyl chloride is added from a cylinder at about 55 p.s.i.g. with stirring for about 16 hrs. After venting the contents, the resin is washed with water until neutral. There is obtained 298 gms. of 33.0% solids quaternary resin which material has a total anion exchange capacity (TAEC) of 3.9 milliequivalents/gms. with a strong base anion exchange capacity (SSC) of 3.7 milliequivalents/gm.

EXAMPLE IV

Gel resin preparation

Fifty-two grams of a styrene/DVB (97.9/2.1 by weight) gel suspension polymer is swollen for 3 hours in 400 gms. of 1-nitropropane. To this swollen polymer in a stirred flask immersed in an ice bath are added 75.2 gms. of N-methylol formamide. Oleum (320 gms.) is then added dropwise over one hour while maintaining the temperature at 5–10° C. The reaction is allowed to warm to room temperature and stirred for 16 hours. Water (250 ml.) is then slowly added with external cooling to keep the temperature below 30° C. The contents are drained of liquid, given two water washes, and the 1-nitropropane azeotroped off with water. After further washed with water, there is obtained 94 gms. of 74% solids resin containing 5.1% nitrogen and no sulfur.

Hydrolysis and quaternization are performed by the same general procedure given in Example I. There is obtained 100.3 gms. of 56.8% solids weak base resin on hydrolysis. This material contains 6.8% nitrogen and has an AEC of 4.62 meq./gm. Quaternization resulted in 172.5 gms. of 51% solids material which had a TAEC of 3.44 meq./gm. and SSC of 3.32 meq./gm.

EXAMPLE V

Reductive methylation of a benzylamine macroreticular weak base derivative (benzylamine resin of Example II (a) To 139 gms. of 45.1% solids benzylamine resin, prepared in a bead of finely divided form and in an identical manner to that of Example II above (but not including the quaternization step with methyl chloride), in sufficient water to make a stirrable slurry is slowly added 121.5 gm. of 37% formaldehyde solution. With stirring, 86.2 gm. of 80% formic acid is slowly added. The contents are heated to 55° C. for 1 hour, 75° C. for 2 hours, and then to 90° C. for 2½ hours. After cooling the reaction to room temperature, the resin is washed several times with water, then treated with 10% aqueous sodium hydroxide. This material is then washed with water until the water effluent is neutral. There are obtained 147 gms. 49% solids, weak base resin in the free base, tertiary amine form having an AEC of 4.45 meq./gm.

---

[1] (88/12) signifies a copolymer of 88 parts or percent by weight of styrene and 12 parts or percent by weight of trimethylolpropane trimethacrylate.

The overall reaction scheme is:

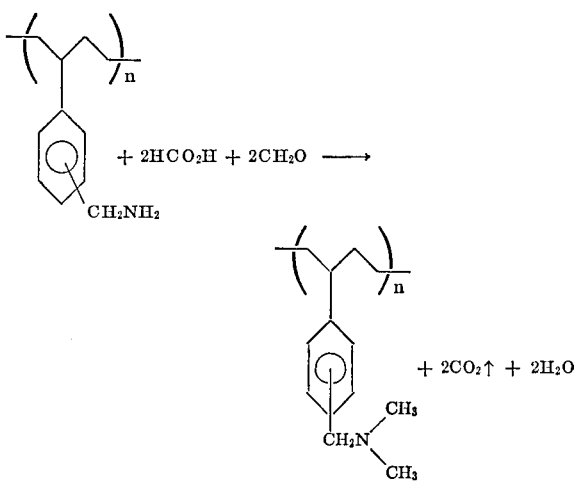

(b) The tertiary amine, weak base resin of (a) above is converted to the amine oxide form by oxidative reaction with hydrogen peroxide. Using about 3 moles of 30% hydrogen peroxide for each mole of tertiary amine or amino group gives virtually complete or 100% conversion to the amine oxide form at a temperature of about 25° C. to 30° C., the reaction taking about 144 hours. Using a smaller molar ratio of hydrogen peroxide and/or a lesser time or lower temperature it is possible to convert to less than 100%, i.e., conversion to about 15–75% amine oxide form can be readily accomplished. The amine oxide resins are also weak base anion exchange resins and show improved physical stability.

EXAMPLE VI

To 147 gms. of 49% solids dimethylbenzylamine resin, prepared in identical manner to that of Example V above, in sufficient water to make a stirrable slurry is slowly added ethylene oxide from a cylinder of this gas; the entire contents kept under autogenous pressure. After allowing the reaction to proceed for 16 hours at about 25° C., the resin is washed thoroughly with water to give 230 gm. of 40% solids, N,N-dimethyl-N-(2-hydroxyethyl)-N-benzylammonium hydroxide strong base anion exchange resin having a TAEC of 3.69 meq./gm. and SSC of 2.77 meq./gm.

EXAMPLE VII

Linear polystyrene (molecular wt. 20,000) (52 gm.) is dissolved in 400 gm. of 1-nitropropane. N-methylolformamide (75.2 gm.) is then charged to the flask followed by the gradual addition of 320 gm. of oleum (20% $SO_3$). The oleum is charged over a 40 minute period while the temperature was maintained between 25 and 30° C. After stirring the reaction for 16 hrs., the reaction mixture was diluted with 300 ml. of water. The 1-nitropropane is then removed via azeotropic distillation and then the contents and stirred with sufficient sodium hydroxide to make a slightly alkaline medium. The polymer is filtered from the reaction mixture, rinsed with copious amounts of water, and then dried from methanol. There are obtained 60 gms. of polyvinylbenzylamine product having 5.4% nitrogen, and having utility as a flocculent.

As noted in Example VII, above, linear aromatic polymers can also be acylaminomethylated and hydrolyzed to produce products useful as flocculents, coatings, etc. These products may be quaternized with any of the commonly available alkyl halides, such as those mentioned hereinbefore, to produce additional useful products, such as polyelectrolytes or flocculents.

TABLE I
[Strong base anion exchange macroreticular resins [b]]

| | Resin A | Resin B | Resin C |
|---|---|---|---|
| Percent solids | 29.0 | 34.9 | 38.5 |
| Total anion exchange capacity (TAEC) | 3.99 | 4.22 | 4.60 |
| True strong base capacity, meq./g. dry | 3.31 | 3.87 | 4.56 |
| Volume capacity, meq./ml | 0.70 | 0.90 | 1.08 |
| Column capacity (kgrs. as $CaCO_3$ per ft.³ of resin) regeneration level [a] at— | | | |
| 10 lbs./ft.³ | 9.3 | 9.4 | 9.9 |
| 4 lbs./ft.³ | 7.8 | 7.9 | 7.9 |
| Total theoretical column capacity (kgrs./ft.³) [c] | 15.3 | 19.6 | 23.6 |
| Percent utilization of total column capacity [d] at— | | | |
| 10 lbs./ft.³ regeneration | 61 | 48 | 42 |
| 4 lbs./ft.³ regeneration | 51.3 | 40.3 | 33.6 |

[a] Influent water (exhausting solution): 300 p.p.m. HCL, 80 p.p.m. $H_2CO_3$, 20 p.p.m. $H_2SiO_3$ rate is 2 gal./ft.³/min. Endpoint 0.3 p.p.m. $SiO_2$. Regeneration: 4% NaOH at 0.75 gal./ft.³/min. 75° F.
[b] All resins are in the free OH⁻ form: Resin A has quaternary ammonium functionality, i.e., —N—$(CH_3)^{+3}$ on a crosslinked matrix or copolymer of 90% styrene and 10% trimethylolpropane trimethacrylate, prepared according to teachings of Example 1. Resin B has quaternary ammonium functionality, i.e., —N—$(CH_3)^{+3}$ on a crosslinked matrix or copolymer of 97% styrene and 3% divinylbenzene, prepared according to the teachings of Example II. Resin C is a standard commercially available, strong base resin having quaternary ammonium functionality, i.e. —N—$(CH_3)^{+3}$ on a crosslinked matrix or copolymer of styrene and divinylbenzene made by conventional chloromethylation and amination procedures.
[c] Total theoretical column capacity is determined by multiplying the volume capacity by the factor 21.8.
[d] Percent (%) utilization of the total column capacity is determined by multiplying by 100 the ratio of the column capacity, at any given regeneration level, to the total theoretical column capacity.

The data in Table I, above, reveals that the percent utilization of total capacity with resins made according to the present invention, i.e. Resins A and B, is significantly higher than that percent utilization occurring with resins (Resin C) produced according to the chloromethylation procedure of the prior art. The total capacity of the Resins A and B also compares favorably with those of the prior art.

Another unexpected result with resins prepared according to the present invention is their ease of elution, particularly with large ions such as those incorporation uranium in their structure. This is shown in Table II, below.

TABLE II

| | Resin D | Resin C |
|---|---|---|
| Uranium capacity, g. $U_3O_8$/l. or resin (saturation) | 45.0 | 49.4 |
| Eluate concentration, g. $U_3O_8$/l. of eluate | 7.5 | 4.29 |
| Elution volume ratio (number of bed volumes or resin required to elute the uranium (in the form of uranyl sulfate) off of the resin) | 6.0 | 11.50 |

Resin C is the same strong base resin as described in Table I. Resin D is a strong base anion exchange resin prepared according to the teachings of Example II except that N-methylolacetamide is used instead of N-methylolformamide. Resin D, used in the OH form, has a TAEC of 4.33 meq./g. and a solids content of 37%. Elution, in the Table II above is accomplished with 10% sulfuric acid.

It is noteworthy that the elution volume ratio for Resin D (prepared according to the present invention) is 6, as compared with 11.5 for the prior art resin C, and that eluate concentration is much higher for Resin D, i.e. 7.5 as compared with 4.29 for Resin C. Thus, the elution properties of resins prepared according to the present invention are markedly superior. This thought to be due, at least in part, to the absence of secondary crosslinking in the resins prepared according to the present invention.

The resin of this invention when prepared for use as anion exchange resins are in the form of beads of finely divided particles, usually in the range of about 10 to about 200 mesh size (U.S. Standard Sieve Series), and more preferably in the range of about 16 to 60 mesh size.

It is to be understood that wherever reference in the case is made to the use of N-methylolformamide one can use instead a mixture of formamide and formaldehyde which forms N-methylolformamide in situ, and similarly instead of N-methylolacetamide one can use a mixture of acetamide and formaldehyde which forms N-methylolacetamide in situ.

I claim:

1. A process for introducing aminomethyl groups into an aromatic vinyl polymer which comprises reacting the polymer with at least about a ½ molar quantity of a non halogen-containing acylaminomethylating agent in the presence of a swelling agent for the polymer and an acidic catalyst to form the corresponding acylaminomethyl polymeric derivative, and thereafter splitting off acyl groups from the acylaminomethylated polymer by hydrolysis.

2. Process according to claim 1 wherein the acylaminomethylating agent is an N-methylolamide and the molar quantity or ratio of the acylaminomethylating agent to the aromatic vinyl polymer, calculated or based on the aromatic nuclei present in the polymer, is between about ½ to about 4.

3. A process of producing a water-insoluble anion exchange resin which comprises introducing aminomethyl groups into a crosslinked aromatic vinyl polymer by reacting said crosslinked aromatic vinyl polymer with at least about a ½ molar quantity of a non halogen-containing acylaminomethylating agent in the presence of a swelling agent for the crosslinked aromatic vinyl polymer and an acidic catalyst thereby forming the corresponding acylaminomethyl aromatic vinyl crosslinked polymer, and thereafter splitting off acyl groups from acylaminomethylated aromatic vinyl crosslinked polymer by hydrolysis.

4. A process according to claim 3 wherein the acylaminomethylating agent has the formula

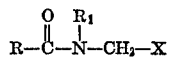

where

R is H or alkyl or aryl or —$NY_1Y_2$ where $Y_1$ and $Y_2$ can be H or alkyl or aryl and both $Y_1$ and $Y_2$ are the same or different, $R_1$ is H or alkyl or aryl or hydroxyalkyl, and X is

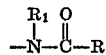

R and $R_1$ having the same significance as given above, or —OZ where Z is H or alkyl or aryl or acyl of the formula

where $R_2$ is alkyl of 1 to 18 carbon atoms or aryl of 6 to 18 carbon atoms.

5. Process according to claim 4 wherein the molar ratio of the acylaminomethylation agent to the crosslinked aromatic vinyl polymer is in the range of about ½ to about 4, and the acylaminomethylating agent is a N-methylolamide.

6. Process according to claim 5 wherein the N-methylolamide is N-methylolformamide or N-methylolacetamide.

7. Process according to claim 6 wherein the swelling agent is a nitro-substituted aliphatice or aromatic hydrocarbon, and the acidic catalyst is sulfuric acid or a mixture of sulfuric acid and at least one other acid.

8. Process according to claim 3 wherein the anion exchange resin being produced is a strong base anion exchange resin which includes the additional step of converting the aminomethylated aromatic vinyl crosslinked polymer, after the hydrolysis step, to a polymer having quaternary ammonium functionality by reaction with an alkylating agent.

9. A process according to claim 3 for producing a water-insoluble anion exchange weak base resin having tertiary amine functionality which comprises the step of, after the hydrolysis step, reductively methylating the hydrolyzed polymer containing primary amine functionality to one containing tertiary amine functionality by reaction with formaldehyde and formic acid.

10. A process according to claim 9 wherein at least a portion of the tertiary amine functionality in the weak base resin is converted to amine oxide functionality.

References Cited

UNITED STATES PATENTS

| 2,780,604 | 2/1957 | Clarke et al. | 260—2.1 |
| 2,992,544 | 7/1961 | McMaster | 260—2.1 |
| 3,008,927 | 11/1961 | Seifert | 260—73 |
| 3,533,969 | 10/1970 | Bufton | 260—2.1 |

MELVIN GOLDSTEIN, Primary Examiner

U.S. Cl. X.R.

260—88.25

UNITED STATES PATENT OFFICE
CERTIFICATE OF CORRECTION

Patent No.  3,791,996           Dated  February 12, 1974

Inventor(s)  Richard B. Wuchter

It is certified that error appears in the above-identified patent and that said Letters Patent are hereby corrected as shown below:

In column 1, line 33, change the word "aminolakyl" to read -- aminoalkyl --.

In column 2, line 45, change "," after $AlCl_3$ to -- $AlCl_3$. --.

In column 5, line 54, change the word "N-methylolfromamide" to read -- N-methylolformamide --.

In column 6, line 10, change the word "resins" to read -- resin --.

In column 6, line 73, after gms. and before 49%, insert the word -- of --.

Signed and sealed this 13th day of August 1974.

(SEAL)
Attest:

McCOY M. GIBSON, JR.
Attesting Officer

C. MARSHALL DANN
Commissioner of Patents